US006619972B2

(12) United States Patent
Boeve

(10) Patent No.: US 6,619,972 B2
(45) Date of Patent: Sep. 16, 2003

(54) CONDUCTIVITY STRAP ARRANGEMENT FOR A VALVE STEM

(76) Inventor: Scott W. Boeve, 530 W. Orleans St., Otsego, MI (US) 49078

( * ) Notice: Subject to any disclaimer, the term of this patent is extended or adjusted under 35 U.S.C. 154(b) by 18 days.

(21) Appl. No.: 09/999,224

(22) Filed: Nov. 30, 2001

(65) Prior Publication Data

US 2003/0104716 A1 Jun. 5, 2003

(51) Int. Cl.[7] .................................................. H01R 4/60
(52) U.S. Cl. ....................................... 439/193; 439/100
(58) Field of Search ................................. 439/192, 193, 439/371, 96, 98, 100

(56) References Cited

U.S. PATENT DOCUMENTS

| 511,188 | A | * | 12/1893 | Barnard | 439/192 |
| 622,481 | A | * | 4/1899 | Jackson | 307/95 |
| 1,032,295 | A | * | 7/1912 | Politz | 439/192 |
| 1,590,590 | A | * | 6/1926 | Seymour et al. | 439/100 |
| 2,347,897 | A | * | 5/1944 | Febrey | 439/192 |
| 4,449,553 | A | * | 5/1984 | Sullivan et al. | 138/35 |
| 5,491,892 | A | * | 2/1996 | Fritz et al. | 29/857 |

* cited by examiner

Primary Examiner—Tho D. Ta
Assistant Examiner—James R. Harvey
(74) Attorney, Agent, or Firm—Flynn, Thiel, Boutell & Tanis, P.C.

(57) ABSTRACT

A conductivity strap arrangement is provided, particularly for use on non-conductive water supply valves. The conductivity strap arrangement includes a conductivity strap having a braided strap section that is deformable to form an opening therein which fits onto a valve stem. The opposite ends of the conductivity strap are connected to adjacent pipe sections either directly to the pipe sections or to a connector fitting to define an electrical current path from the valve operating nut through the conductivity strap to adjacent pipe sections.

20 Claims, 4 Drawing Sheets

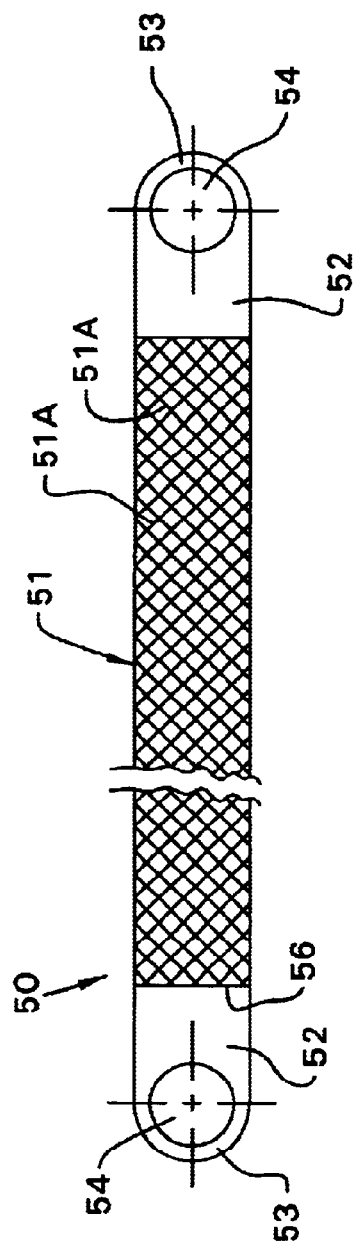
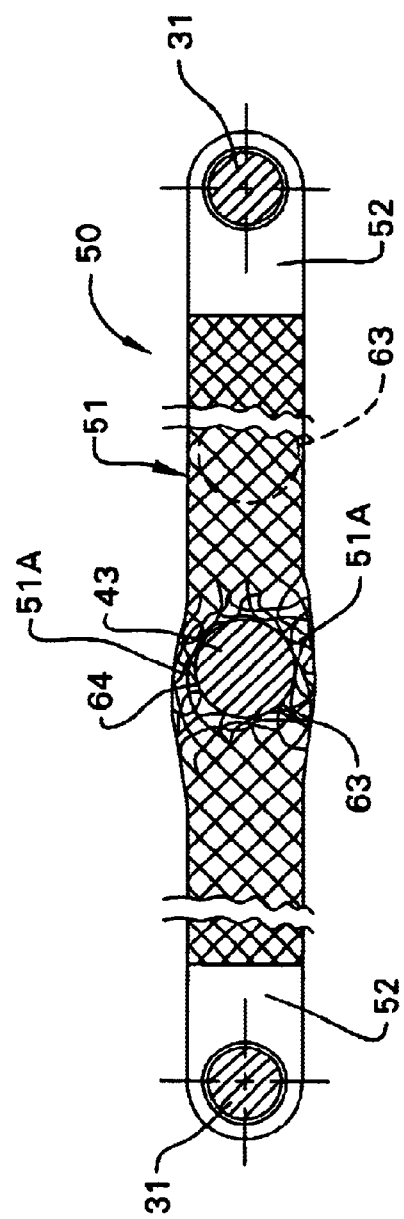

CONDUCTIVITY STRAP ARRANGEMENT FOR A VALVE STEM

FIELD OF THE INVENTION

The invention relates to a conductivity strap arrangement and more particularly, to a conductivity strap arrangement for use with a valve having a non-conductive valve gate.

BACKGROUND OF THE INVENTION

Public water supply systems include underground piping to direct pressurized water throughout a community. This piping typically includes a number of manually operable valves located at multiple locations throughout the system to selectively control water flow through the piping. While the vast majority of the piping is buried and inaccessible, the valves are located within access passages that typically are enclosed by a removable manhole cover or curb-box cover. To actuate the valve, long steel valve wrenches are provided which allow a utility worker to place a valve wrench on the operating nut of the valve when the utility worker is at ground level. The utility worker can turn the valve wrench from ground level to open and close the valve.

During operation of the system, it may be necessary to either locate the piping below ground such as for repair work or laying of new utilities. Also, during extremely cold conditions, piping may become frozen and it would then be necessary to thaw the blocked piping.

A common practice for locating and/or thawing piping is to apply an electrical current to the piping which current flows through the piping and can either be detected for locating purposes or causes heating of the piping due to the resistance of the metal pipe material. Therefore, during installation of a piping system, the water supply system typically is designed to permit current flow therethrough.

Many gate valves used in such systems include a conductive valve gate. This valve gate is connected to the metal operating nut on the valve through a conductive valve stem while the valve itself is connected to the metal piping. Therefore, it is a common practice to place the metal valve wrench on the operating nut and apply a current to the valve wrench, for example, by the connection of a welder or a car battery charger directly to the exposed upper end of the valve wrench. This applies a current to the valve wrench and therefore to the valve which current then is able to flow to the piping connected to the opposite ends of the valve.

Away from the valve area, metal-to-metal contact may be present between two sections of piping at a joint therebetween, such that the current is able to flow directly from one pipe section to another pipe section. However, some pipe sections are joined together by compression fittings which compression fittings may break the conductivity path. Accordingly, for such fittings, it also is known to connect opposite ends of a conductivity cable to individual pipe sections to ensure that a conductive path extends between the pipe sections adjacent to the fitting.

While such systems are known, another type of gate valve uses a non-conductive valve gate, for example, where the valve gate is coated by a non-conductive material. The non-conductive valve gate thereby breaks the current path which otherwise would extend from the operating nut to the valve body.

It therefore is an object of the invention to overcome the disadvantages associated with using a nonconductive gate valve in a water system.

The invention relates to a conductivity strap arrangement which allows for the flow of current from an operating nut of a non-conductive valve to the adjacent pipe sections connected to the valve. The conductivity strap arrangement generally includes a conductivity strap having lugs at the opposite ends of a flexible strap section wherein the lugs are electrically connected to the adjacent pipe sections. The strap section of the conductivity strap mounts to the valve stem so that a current applied to the operating nut through a valve wrench thereby is able to flow to the adjacent pipe sections.

Preferably, the conductivity strap is formed of a stranded conductive material which does not have a performed hole in the intermediate portion of the strap. Rather, the strands of conductive material may be separated during installation and pressed onto the upper end of the valve stem. Preferably, the strands are braided or intertwined. In this manner, the valve stem spreads the strands of the conductive material apart from each other to form a hole in sit-up. This is particularly advantageous since the separated braids of the strap provides a tight gripping fit with the valve stem and provides firm conductive contact therebetween.

Additionally, the opposite ends of the strap may be pulled longitudinally which tightens the braided strands about the valve stem to improve contact of the strap with the.exterior surface of the valve stem. The lugs at the opposite ends of the strap are fixed to a locking gland or collar used to join the adjacent pipe sections together. Since the valve stem and the operating nut are both formed of metal, current applied through the steel valve wrench flows through the operating nut to the valve stem and thereby flows through the conductivity strap.

With this arrangement, non-conductive gate valves can be readily used as current input locations by use of an inexpensive conductivity strap that may be readily installed merely by removing the operating nut.

Other objects and purposes of the invention, and variations thereof, will be apparent upon reading the following specification and inspecting the accompanying drawings.

BRIEF DESCRIPTION OF THE DRAWINGS

FIG. 4 is a top view of the conductivity strap in an un-deformed condition.

FIG. 5 is a plan view of the conductivity strap in a deformed condition as mounted to a valve stem and to adjacent pipe sections.

Figure 1:
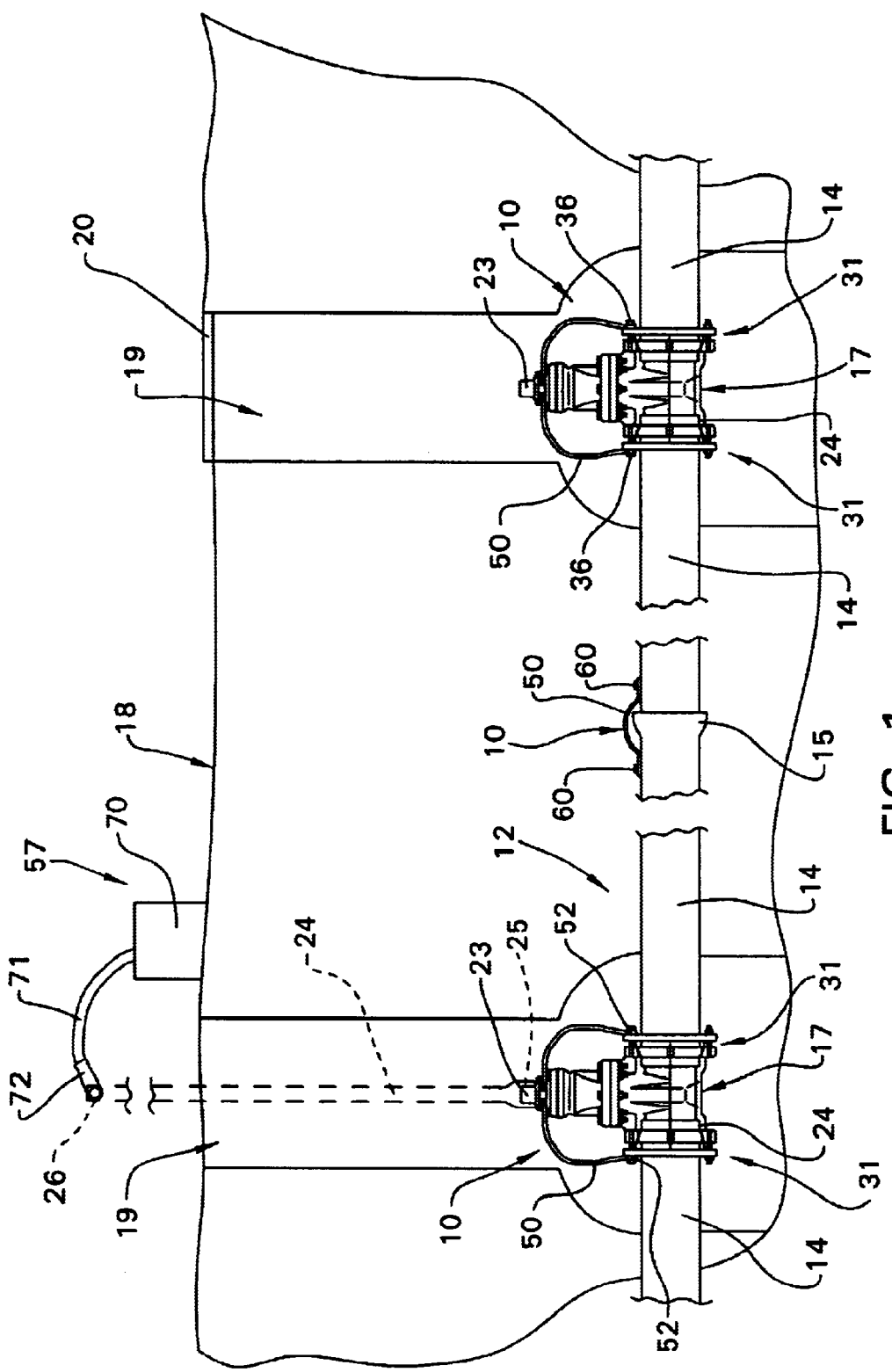
FIG. 1 is a diagrammatic elevational view of a piping system having conductivity straps of the invention mounted to the gate valves of the piping system.

Certain terminology will be used in the following description for convenience and reference only, and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the arrangement and designated parts thereof. Said terminology will include the words specifically mentioned, derivatives thereof, and words of similar import.

DETAILED DESCRIPTION

Referring to FIG. 1, the invention relates to a conductivity strap arrangement 10 as used in combination with a water supply or distribution system 12.

Generally, the conductivity strap arrangement 10 is readily usable with the water supply system 12, whether the system 12 may be a pre-existing system or a new system. A representative arrangement for the system 12 is illustrated in FIG. 1 wherein the system is formed of a variety of piping components which include valves 17 and a plurality of pipe sections 14 which are laid underground and then buried. Many of the pipe sections 14 are joined directly one to the other at a pipe junction 15. For each pipe junction 15, any known connection technique may be used. In the illustrated arrangement, a compression fitting joins the two pipe sections 14 together. Additionally, the water valves 17 are connected serially between adjacent pairs of pipe sections 14.

Typically, the valves 17 are accessible from ground level 18 through vertical access passages 19. The access passages 19 are covered at the upper ends thereof by conventional access covers like manhole covers 20 or curb-box covers. The access passages provide ready access to the valve 17 in order to selectively control the flow of water therethrough. In this regard, each valve 17 typically includes an operating nut 23 which projects vertically from an upper end of the valve housing 24. As will be discussed in further detail herein, rotation of the operating nut 23 opens or closes the valve 17. To effect rotation of the operating nut 23, a valve wrench 24 is used to operate the nut 23 from ground level 18.

More particularly, the valve wrench 24 includes a socket 25 at the lower end thereof and a handle 26 at the upper end thereof. The wrench 24 is vertically elongate such that the handle 26 projects out of the access passage 19 when the socket 25 is engaged with the operating nut 23. This allows a utility worker to rotate the handle 26 from ground level 18 to operate the valve 17 which typically is located several feet or more under ground. The valve wrench 24 is formed of a conductive metal such as steel.

When further utility work is being conducted near the water supply system 12, it is necessary to be able to locate the pipe sections 14 of the system to ensure that these sections 14 are not inadvertently severed when digging trenches adjacent thereto. Also, in cold climates, the piping may become frozen and it would become necessary to thaw the piping or if freezing of the piping causes a break therein, to locate the piping. In this regard, it is conventional to apply an electrical current through the conductive components of the water supply system 12. The current can either be detected by sensors when attempting to locate the water supply system 12 or in the event of frozen piping, the current generates heat due to the inherent resistance of the conductive piping material.

In many systems, the water valves of a water supply system are gate valves which use conductive materials for the operating nut and the valve housing, as well as a valve stem which connects the operating nut to a valve gate. With such gate valves, a current is able to pass from the operating nut to adjacent pipe sections.

For any joints between adjacent pipes where a conductive path is broken, it also is known to apply a conductive wire which spans the joint so that the conductive path is completed between adjacent pipe sections 14. To apply a current to conventional water supply systems, it is known to engage a pipe wrench like the pipe wrench 24 to the operating nut of a fully conductive valve and then supply a current to the pipe wrench 24 such as through a welder or car battery charger.

However, for the valves 17 of the illustrated water supply system 12, the valve 17 is not fully-conductive. More particularly, the valves 17 are a type of gate valve which utilizes a non-conductive gate.

Figure 2:
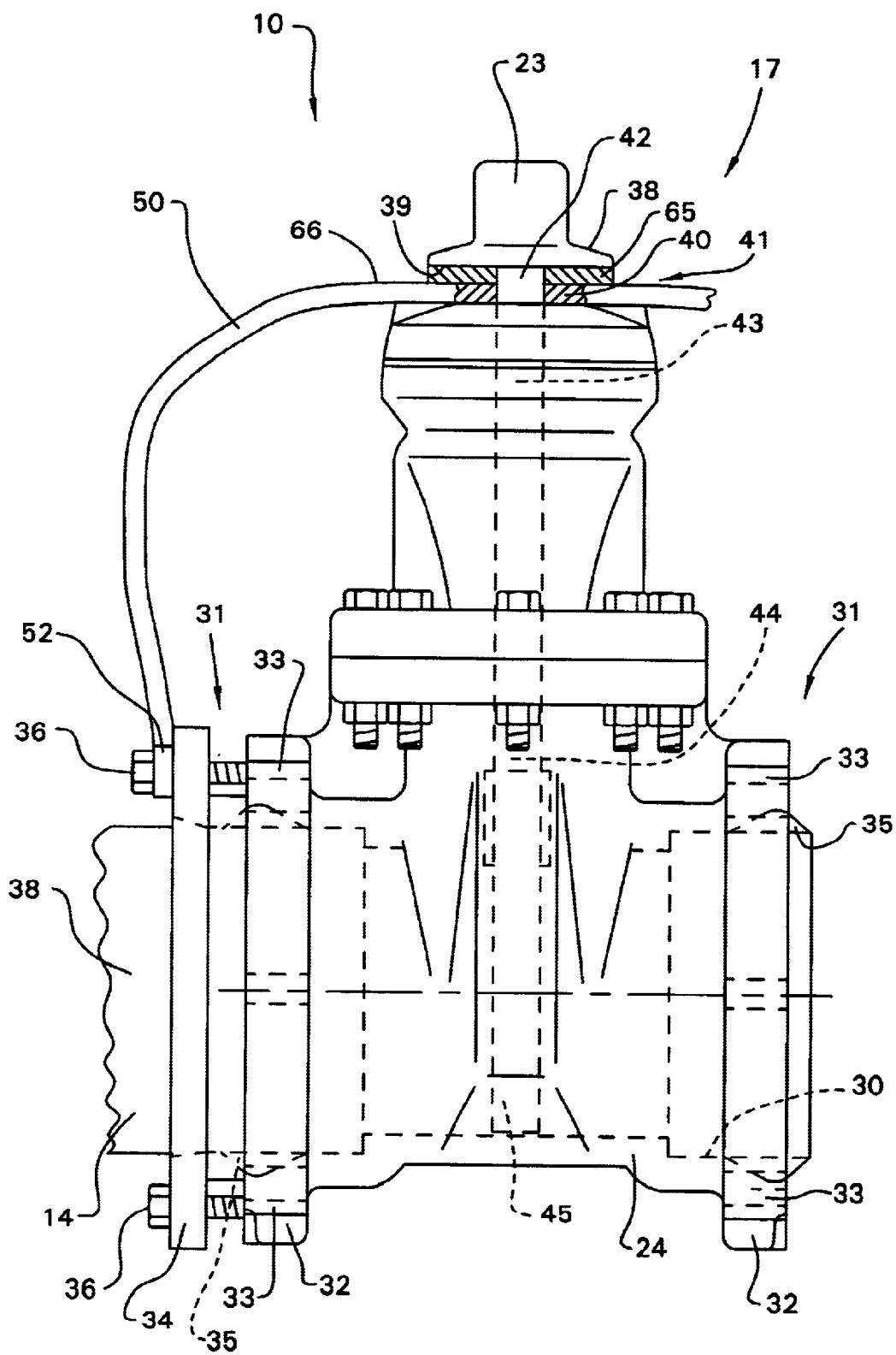
FIG. 2 is an enlarged view of a nonconductive gate valve.
Figure 3:
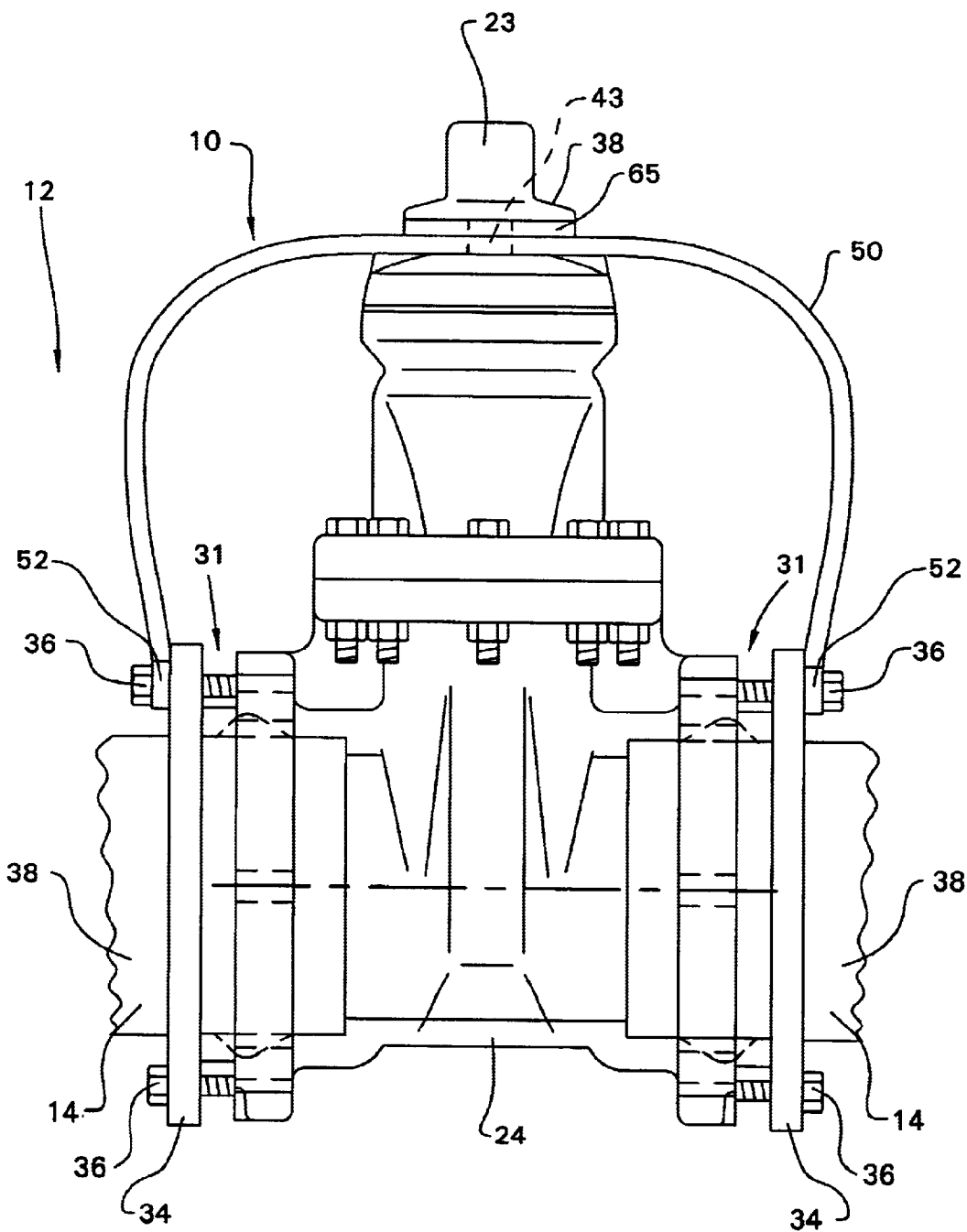
FIG. 3 is a front elevational view of the gate valve with the conductivity strap connected to adjacent pipe sections.

More specifically referring to FIG. 2, the gate valve 17 has a metal valve body 24 which includes a cylindrical port opening 30 that extends horizontally through the valve housing 24 to define a waterway. The opposite ends of the valve body 24 are configured to define mechanical joints 31 between the valve body 24 and adjacent pipe sections 14.

The valve body 24 includes annular flanges 32 which face in opposite directions and include a plurality of bolt holes 33 which are circumferentially spaced from each other. Each mechanical joint 31 further includes a locking gland or compression collar 34 and an annular compression ring 35 which is confined axially between the compression collar 34 and the flange 32. A plurality of bolts 36 extend axially into the bolt holes 33. When tightening the bolts, the locking gland or compression collar 34 is drawn axially towards the flange 32 to cause the sealing collar 35 to grip the outer circumference 38 of the pipe section 14 and define a leak-proof mechanical joint 31 therebetween. Each mechanical joint 31 is formed in this manner.

It will be understood that while a mechanical joint 31 is illustrated herein, other conventional types of joining methods are used to connect pipe sections to valves such as the use of bolt flanges, typically for interior applications, threaded joints, slip on joints and combinations thereof. The conductivity strap arrangement 10 of the invention is usable with any of these types of valves.

Further as to the valve 17, the operating nut 23 projects out of the top end of the valve body 24 and has a geometric shape which is engageable with the socket 25 of the valve wrench 24. The operating nut 23 also includes an annular flange 38 that defines a downward facing bottom surface 39 which is disposed in opposing relation with an upper surface 40 of the valve body 24. The bottom nut surface 39 and the top valve surface 40, however, are disposed in vertically spaced relation to define a clearance space 41 therebetween.

The operating nut 23 is drivingly connected to the upper end 42 of a valve stem 43 which projects downwardly through the valve body 24 into the valve port 30. While the valve stem 45 typically is formed of a conductive material, the valve stem 43 also is conductively isolated from the valve body 24 by multiple O-ring stem seals (not illustrated).

The valve 17 of the illustrated arrangement may be a Mueller® resilient wedge gate valve as sold by Mueller Company of Chattanooga, Tennessee. Such a gate valve is disclosed in a Mueller brochure (Form 11744-Rev. 5/99-20M-1), the disclosure of which is incorporated herein by reference in its entirety. Additionally, the valve body 24 of this valve may be fully coated with a non-conductive powder epoxy which creates an electrical barrier which may further prevent the passage of the electrical current through the valve body 24.

More particularly, the lower end 44 of the valve body includes a generally flat vertically elongate valve gate 45. The valve gate 45 includes non-conductive components and has a non-conductive coating so as to break any conductive path between the valve stem 43 and the valve body 24. The non-conductivity of the valve gate 45 therefore normally prevents the application of an electrical current to the pipe sections 14 through the use of the pipe wrench 24.

Accordingly, the conductivity strap arrangement 10 is provided to create current paths directly from the valve stem 43 to the adjacent pipe sections 14 as discussed in further detail herein.

The arrangement 10 includes a conductivity strap 50 which is illustrated in FIG. 4. The conductivity strap 50 includes an intermediate, relatively flat and thin strap section 51 and metal mounting lugs 52 which are connected to the opposite ends of the strap section 51. Each lug 52 is formed of a solid conductive metal having a generally rectangular cross-sectional shape wherein the outer end of the lug 52 defines a mounting section 53 which is adapted to be fixedly engaged with a pipe section 14. The mounting section 53 includes a bolt hole 54 extending vertically therethrough so that the lug 52 may be bolted onto the pipe section 14 through the locking gland 34 as described in further detail herein. Additionally, the inner end 56 of the lug 52 is electrically and mechanically connected to the end of the strap section 51.

The strap section 51 is formed of a conductive material which is able to carry the current being applied to the system by an electrical source 57 (FIG. 1). Preferably, the strap section 51 will have a peak load capacity of 300 amps with a sustained load capacity of 150 amps.

The strap section 51 also has a construction formed of individual strands 51A of wire which are intertwined together. The strap section 51 specifically is formed of two (2) gage or greater braided copper strands 51A which are electro-tinned to prevent underground corrosion. An example of stock material for the preferred strap section 51 is braided copper cable manufactured by Ormiston Wire, Ltd. of Isleworth, Middlesex, United Kingdom. The advantage of the braided strap material is that the individual strands 51A of the braided material may be separated to form an opening therethrough yet remain intertwined to limit separation thereof.

During installation, the bolt openings 54 of the lugs 52 receive the respective bolts 36 therethrough. As such, the lugs 52 are bolted onto the collars 34 so that the pipe sections 14 are mechanically and electrically connected to the conductivity strap 50.

Prior to bolting of the conductivity strap 50 in place, the intermediate strap section 51 is fixed onto the valve stem 43 to define an electromechanical connection therebetween. In particular, the operating nut 23 is removed and then the individual strands 51A of the strap section 51 are separated to define a hole 63 extending centrally therethrough as seen in FIG. 5. Typically, the upper end of the valve stem 43 would be forced through the strands 51A to facilitate separation thereof and form the hole 63 wherein the strap section 51 tight-fittingly surrounds the valve stem 43. As such, the conductivity strap 50 is electrically connected to the valve stem 43 through the contact between the braided strands 51A of the strap section 51 and the exterior surface 64 of the valve stem 43. To further improve the electrical connection therebetween, the opposite ends of the strap section 50 may be pulled longitudinally away from each other or tensioned which causes the strands 51A to constrict the opening 43 and tighten the strands 51A about the periphery 64 of the valve stem 43. Thereafter, the lugs 52 are bolted to the pipe section 14 as previously described above.

When the operating nut 23 is refastened to the valve stem 43, the operating nut 23 thereby is electrically connected to the conductivity strap 50 through the valve stem 43. Additionally, a resilient washer 65 is fitted onto the valve stem 43 prior to the reinstallation of the operating nut 23. The washer 65 is formed of a resiliently compressible material and is confined vertically between the upper surface 66 of the conductivity strap 50 and the bottom nut surface 39. This provides a pressure acting downwardly against the conductivity strap 50 to limit shifting thereof and maintain the strap 50 flat but also permits free rotation of the operating nut 23 and valve stem 43. By providing a gap between the operating nut 23 and the top surface 40 of the valve housing 24, this prevents clamping of the strap 50 between the nut 23 and valve body 24 which likely would cause binding and possibly prevent rotation of the valve nut 23.

Preferably, the braided strap section 51 is exposed along its entire length which thereby permits the valve stem 43 to be inserted at any point along the length of the strap section 51. Therefore, the stem opening 63 can be formed at any location along the length of the strap section 51 and also, multiple openings 63 may be formed therein as generally illustrated in phantom outline in FIG. 5. Such multiple openings 63 may be used on multiple valves 17 or may merely be used to reposition a strap 50 on a single valve stem 43.

Since the conductive strands 51A are not broken during deformation of the strands in formation of the stem opening 63, the effectiveness or current carrying capacity of the strand section 51 is not reduced by formation of the hole 63. Preferably, the conductivity strap 50 is applied in the above described manner to each valve 17 of the water supply system 12. This allows any one valve 17 of the system to be used as an input for an electrical current, or allows multiple separated valves 17 to be used to input the current at multiple input locations which may be necessary over large areas of the water supply system 12.

During locating or thawing of the piping 14, the valve wrench 24 is mounted to the operating nut 23 and thereafter, the electrical source 57 is connected to the upper end of the valve wrench 24. The electrical source 57 may be a welding unit or a car battery charger which comprises a circuit generating unit 70 and a cable 71 which has a clamp 72 on the end thereof that is clamped to the valve wrench 24. Current thereby is generated and passes along the valve wrench 24 to the operating nut 23, which current then passes through the valve stem 43 to the conductivity strap 50. The current path is completed through the strap 50 to the adjacent pipe sections 14. With this arrangement, the nut 23 effectively serves as an electrical input terminal. Additionally, another strap 50 may also be bolted at its opposite ends to threaded bolts 60 projecting from the pipe sections 14 to cross over a non-conductive joint 15 located between adjacent pipe sections 14 that are directly connected together.

It will also be understood that the washer 65 could be omitted or the position of the washer 65 could be modified so it is located below the strap 50 between the strap 50 and the upper surface 40 of the valve body 24. Therefore, in the event that the valve stem 43 was formed of a non-conductive material, placement of the conductivity strap 50 directly adjacent to and in contact with the bottom surface 39 of the operating nut 23 would complete the conductivity path between the nut 23 and strap 50.

Preferably, the strap 50 is not wound about the valve stem 43 since the strap 50 would tend to loosen when the nut 23 is rotated in one direction, and tighten about the stem 43 and possibly cause binding when the nut 23 is rotated in the opposite direction.

Alternatively, a separate non-functional threaded stem or post could be provided on the valve housing 24 separate from the valve stem 43. The strap 50 can be connected to the post in the same manner as that illustrated in FIG. 5. A nut would be placed on the post to secure the strap 50 in place and also serve as an input terminal.

Alternatively, additional threaded bolts 60 may be fixed onto the exterior surfaces 38 of adjacent pipe sections 14 near each valve 17 so as to project radially therefrom. The bolts 60 preferably are located in proximity and preferably within inches of the mechanical joints 31 and the lugs 52 are fastened thereto.

Although particular preferred embodiments of the invention have been disclosed in detail for illustrative purposes, it will be recognized that variations or modifications of the disclosed apparatus, including the rearrangement of parts, lie within the scope of the present invention.

What is claimed is:

1. In a water distribution system adapted to transport water therethrough comprising first, second and third piping components disposed proximate to each other, said first piping component including a post projecting therefrom having a conductive input terminal which permits input of an electrical current to the water distribution system, a conductivity strap being provided which comprises a flexible intermediate strap section and connector sections at the opposite ends of said strap section, said flexible intermediate strap section being defined by strands of conductive material which are individually flexible wherein said post is inserted through said strands which said strands are separated from each other to form a post-receiving opening therethrough, said strap section being electrically connected to said input terminal wherein said connector sections are fixed to said second and third piping components to thereby define a current path which extends from said input terminal to said second and third piping components.

2. The water distribution system according to claim 1, wherein said strands are intertwined together wherein tensioning of said strap section draws said strands against an exterior surface of said post to constrict said opening.

3. The water distribution system according to claim 2, wherein said connector sections comprise plates which are electrical connected to said strap section.

4. The water distribution system according to claim 3, wherein said second and third piping components include projections to which said connector plates are bolted.

5. The water distribution system according to claim 1, wherein said second and third piping components are defined by pipe sections adapted to carry water therethrough.

6. The water distribution system according to claim 5, wherein said first piping component is defined by a valve which is connected to said pipe sections to permit a flow of water therethrough, said post being defined by a rotatable valve stem and said terminal being defined by an operating nut connected to said valve stem.

7. The water distribution system according to claim 1, wherein said strands are flexible along the length of said strap section to permit formation of said opening at multiple locations along the length of said strap section.

8. A fluid distribution system comprising a valve having a plurality of pipe sections connected thereto to permit a flow of a fluid through said pipe sections and said valve, said valve having a valve stem assembly which is operable to open and close said valve, said valve including a valve body and said valve stem assembly including a valve stem which projects from said valve body, said fluid distribution system including a conductivity strap which is connected to said valve stem assembly and said pipe sections to permit an electrical current to flow from said valve stem assembly to said pipe sections, said conductivity strap comprising a flexible strap section and connector sections connected to said flexible strap section, said connector sections being fixed respectively to said pipe sections and said flexible strap section having a stem opening through which said valve stem is received, said valve stem being electrically connected to said flexible strap section through insertion of said valve stem through said stem opening to complete an electrical current path between said valve stem assembly and said pipe sections.

9. The fluid distribution system according to claim 8, wherein said valve is mechanically connected to but electrically separated from said pipe section, said current path being provided by said conductivity strap.

10. The fluid distribution system according to claim 9, wherein said valve stem includes a current input portion which is electrically connected to said flexible strap section.

11. The fluid distribution system according to claim 10, wherein said input portion comprises an operating nut connected to an end of said valve stem to permit rotation of said valve stem, said electrical source being connected to said operating nut.

12. The fluid distribution system according to claim 8, wherein said valve stem is electrically conductive and an inside surface of said stem opening is disposed in electrical contact with said valve stem.

13. The fluid distribution system according to claim 8, wherein said flexible strap section is defined by braided strands which are individually separable from each other to permit formation of said stem opening by insertion of said valve stem therethrough.

14. The fluid distribution system according to claim 13, wherein said flexible strap section defines multiple locations for formation of said stem opening.

15. A fluid distribution system comprising a plurality of pipe sections through which fluid is adapted to flow and a valve connected to said pipe sections to control a flow of said fluid through said pipe sections, said valve having an electrical-current input terminal comprising a projection which projects from said valve, said fluid distribution system further including a conductivity strap which is electrically connectable to said pipe sections and said valve, said conductivity strap including a flexible strap section defined by intertwined strands of conductive wire and connector sections which are fixed to said strap section, said connector sections being fixed in place adjacent to said pipe sections and said strap section being connected to said projection on said valve, said strands of said braided section being separated to form a projection opening through which said projection is tight-fillingly received to define an electrical connection therebetween, said electrical source being connectable to said input terminal to supply an electrical current to said pipe sections for locating and/or thawing said pipe sections.

16. The fluid distribution system according to claim 15, wherein said intertwined strands are braided together such that tensioning of said conductivity strap constricts said projection opening.

17. The fluid distribution system according to claim 15, wherein said strap section has a generally flat configuration.

18. The fluid distribution system according to claim 15, wherein said projection includes an annular flange which projects outwardly from the projection, said strap section being confined between opposing surfaces of said annular flange and said valve from which said projection projects.

19. The fluid distribution system according to claim 18, wherein said projection is defined by a rotatable valve stem for actuating said valve and said annular flange is defined by an operating nut connected to said valve stem.

20. The fluid distribution system according to claim 15, which includes an electrical source removably connected to said input terminal.

\* \* \* \* \*

UNITED STATES PATENT AND TRADEMARK OFFICE
CERTIFICATE OF CORRECTION

PATENT NO.     : 6,619,972 B2
DATED          : September 16, 2003
INVENTOR(S)    : Scott W. Boeve It is certified that error appears in the above-identified patent and that said Letters Patent is hereby corrected as shown below:

Column 7,
Line 34, change "electrical" to -- electrically --.

Signed and Sealed this

Thirtieth Day of December, 2003

JAMES E. ROGAN
*Director of the United States Patent and Trademark Office*